US007752617B2

(12) United States Patent
Blinick et al.

(10) Patent No.: US 7,752,617 B2
(45) Date of Patent: Jul. 6, 2010

(54) APPARATUS, SYSTEM, AND METHOD FOR UPDATING AN EMBEDDED CODE IMAGE

(75) Inventors: Stephen La Roux Blinick, Tucson, AZ (US); Brian Jeffrey Corcoran, Oro Valley, AZ (US); Matthew Joseph Kalos, Tucson, AZ (US); Ricardo Sedillos Padilla, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1313 days.

(21) Appl. No.: 10/717,941

(22) Filed: Nov. 20, 2003

(65) Prior Publication Data

US 2005/0114685 A1    May 26, 2005

(51) Int. Cl.
*G06F 9/44* (2006.01)
*G06F 7/00* (2006.01)
(52) U.S. Cl. .................. 717/170; 717/120; 717/169; 707/101
(58) Field of Classification Search ................. 717/170
See application file for complete search history.

(56) References Cited

U.S. PATENT DOCUMENTS

| 6,085,333 | A  | * | 7/2000  | DeKoning et al. | 714/7   |
|-----------|----|---|---------|-----------------|---------|
| 6,658,659 | B2 | * | 12/2003 | Hiller et al.   | 717/170 |
| 6,986,132 | B1 | * | 1/2006  | Schwabe         | 717/168 |
| 2003/0092438 | A1 | * | 5/2003 | Moore et al. | 455/423 |
| 2003/0120909 | A1 | * | 6/2003 | Zimmer et al. | 713/2 |
| 2004/0044997 | A1 | * | 3/2004 | Talati et al. | 717/170 |
| 2005/0114391 | A1 | * | 5/2005 | Corcoran et al. | 707/103 R |

FOREIGN PATENT DOCUMENTS

WO      WO 02/13003 A2 *  2/2002

OTHER PUBLICATIONS

Mikhail Dmitriev, "Safe Class and Data Evolution in Large and Long-Lived Data Applications", Mar. 2001, University of Glasgow, Scotland, UK, pp. 1-191.*

* cited by examiner

*Primary Examiner*—Michael J Yigdall
*Assistant Examiner*—Ben C Wang
(74) *Attorney, Agent, or Firm*—Kunzler Needham Massey & Thorpe

(57) ABSTRACT

An apparatus, system, and method are provided for updating a code image. The apparatus, system, and method include a loader for loading a new code image into a temporary memory location separate from the memory location occupied by the old code image. A conversion module of the new code image executes and selectively reconciles incompatibilities between the old code image and the new code image. In one aspect, once incompatibilities are reconciled, a copy module copies the new code image into the memory space occupied by the old code image.

25 Claims, 6 Drawing Sheets

APPARATUS, SYSTEM, AND METHOD FOR UPDATING AN EMBEDDED CODE IMAGE

BACKGROUND OF THE INVENTION

1. Field of the Invention

The invention relates to embedded code such as microcode. Specifically, the invention relates to apparatus, systems, and methods for sharing a cached security profile in a database environment.

2. Description of the Related Art

Users continue to require high availability from computer systems and computer subsystems. Web servers, database servers, application servers, and the like are expected to provide around the clock availability. Maintenance and upgrades to the systems should minimize the time that the system is off-line.

The computer system or subsystem includes a basic set of instructions for performing operations. This basic set of instructions comprises a fundamental set of computer instructions, similar to an operating system, which define how the computer system or subsystem will function. Generally, this basic set of instructions is referred to as the code image, microcode, embedded code, or the like. The code image typically is assembly code instructions or raw machine language binary code instructions that are optimized for a particular microprocessor and/or set of hardware.

Typically, a Basic Input Output System (BIOS) program loads the code image into volatile RAM when a computer system is powered up. Alternatively, the code image is stored in non-volatile RAM or other forms of memory. Execution of the instructions in the code image begins once the computer system properly initializes.

Periodically, the code image must be updated to provide improved functionality, resolve programming bugs, and/or support improved hardware. It is desirable that an old code image be updated with a new code image with minimal interruption of the computer system concurrently executing the old code image. In addition, it is desirable that the new code image be stored in substantially the same location in memory as the old code image. The code image update should require minimal time, comprise operations of minimal complexity, and provide minimal delay in resuming regular operations once the update completes.

Conventionally, code image updates are performed by a section of the old code image known as the bootstrap code. The bootstrap code is executed in response to an interrupt signaling a code image update operation. Generally, the bootstrap code copies a new code image directly from a source such as a disk drive into the same space occupied by the old code image. The copy operation overwrites the old code image with the new code image. This process is known as a code overlay.

Typically, a new code image includes changes in initialization processes for various hardware, formats for data structures, parameter lists used to interact with other modules of a computer system, maintenance of persistent data, updating of other dependent code images, and the like. The changes may be made to resolve resource conflicts, comply with updated communication protocols, resolve coding errors, and add improved functionality. Failure to make these changes can cause the new code image to be incompatible with other software and hardware components of the computer system.

Unfortunately, conventional code overlay operations do not allow for handling of these incompatibilities between the old code image and the new code image. In order for a conventional code overlay to handle such incompatibilities, the bootstrap code of the old code image would need to be coded to anticipate and reconcile the incompatibilities and differences. Such incompatibilities are unknown at the time the instructions of the bootstrap code are written and stored in the old code image.

Accordingly, what is needed is an improved apparatus, system, and method for updating a code image. The apparatus, system, and method should identify incompatibilities between an old code image and a new code image. The apparatus, system, and method should reconcile incompatibilities between the old code image and a new code image. In addition, the apparatus, system, and method should preserve an environment associated with the old code image to facilitate reconciliation of incompatibilities by a bootstrap portion of the new code image. The apparatus, system, and method should also reconcile incompatibilities prior to copying the new code image over the old code image.

BRIEF SUMMARY OF THE INVENTION

The present invention has been developed in response to the present state of the art, and in particular, in response to the problems and needs in the art that have not yet been met for updating code images while minimizing down time for computer systems concurrently executing transactions. Accordingly, the present invention has been developed to provide an apparatus, system, and method for updating code images that overcome many or all of the above-discussed shortcomings in the art.

An apparatus according to the present invention includes a loader, a conversion module, and a copy module. The loader loads a new code image into a temporary memory location separate from a memory space occupied by and used by an old code image. Typically, the loader loads the new code image from non-volatile storage. Alternatively, the loader may load the new code image from a data stream.

The conversion module selectively reconciles incompatibilities between the old code image and the new code image. In one embodiment, the conversion module reconciles incompatibilities by executing bootstrap code of the new code image. In certain embodiments, incompatibilities may be identified by comparing version information or capability information for the old code image and the new code image. Incompatibilities may vary depending on the version of the old code image and the version of the new code image. Incompatibilities may comprise differences in initialization requirements, differences between data structures used by the new code image and old code image, persistent data that should be made available to the new code image, other modules that should be updated, sequences of updates and/or initializations, and the like.

The copy module copies the new code image into the memory space occupied by the old code image. Preferably, the copy module performs the copy operation once incompatibilities are reconciled. Once the copy module copies the new code image, an initialization module may initiate execution of a run-time segment of the new code image.

A system of the present invention is provided for overlaying an old code image with a new code image. The system includes a memory, a processor, and a data structure. The memory comprises an old code image and a buffer configured to store a new code image. The processor executes instructions of the old code image to perform one or more operations. The processor is configured to execute instructions of the old code image and the new code image. The data structure stores an old code image pointer and a new code image pointer. The processor begins executing bootstrap code within the new code image, in response to an interrupt. The interrupt may be a signal, a message, an email message, or the like. Preferably, the bootstrap code reconciles incompatibilities between the old code image and the new code image.

A method of the present invention is also presented for updating a code image. In one embodiment, the method includes loading a new code image into a temporary memory location separate from a memory space occupied by and used by an old code image. Next, incompatibilities between the old code image and the new code image are selectively reconciled. Then, the new code image is copied into the memory space occupied by the old code image.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
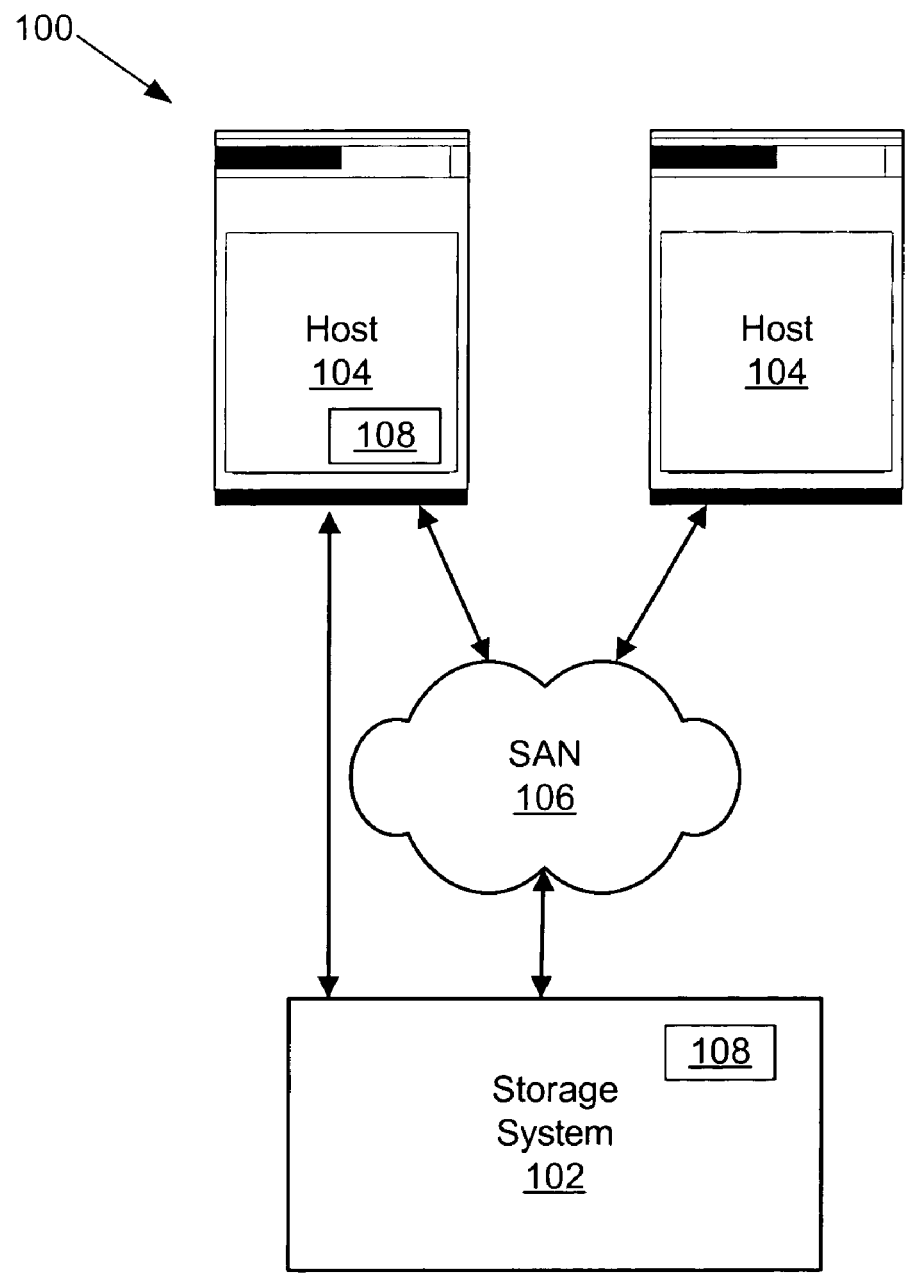
FIG. 1 is a schematic block diagram illustrating a system suitable for implementing the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a system 100 suitable for implementing the present invention. The system 100 includes a storage system 102 and one or more hosts 104. The hosts 104 may connect directly to the storage system 102. Alternatively, the hosts 104 communicate with the storage system 102 over a SAN 106. The storage system 102 performs high performance data storage.

The SAN 106 is in one embodiment a dedicated network comprising routers (not shown), switches (not shown), and the like for high-speed data transfers between devices connected to the SAN 106. Devices connected to the SAN 106 communicate using high-speed protocols such as Fibre Channel, Enterprise System Connection® (ESCON), Fiber Connection (FICON) channel, Small Computer System Interface (SCSI), and the like.

To minimize workload on a host 104, the host 104 includes a Host Bus Adapter (HBA) 108. Alternatively, the HBA 108 may reside within the storage system 102. The HBA 108 manages most operations required to transfer data between the host 104 and the storage system 102. In particular, the HBA 108 is optimized to perform many I/O operations very rapidly with little or no involvement of the host 104.

Throughout this specification, various embodiments of the present invention will be described in relation to processor(s) and memory used specifically in HBAs 108 for purposes of brevity and clarity in describing the present invention. Nevertheless, the embodiments described herein are representative examples only and are not intended to limit the scope of the present invention as defined by the claims. Those of skill in the art will appreciate that the present invention may be implemented in any computer or electrical system which includes a processor such as a microprocessor, Application Specific Integrated Circuit (ASIC), or the like that executes code images and allows the code images to be updated using a code overlay.

Figure 2:
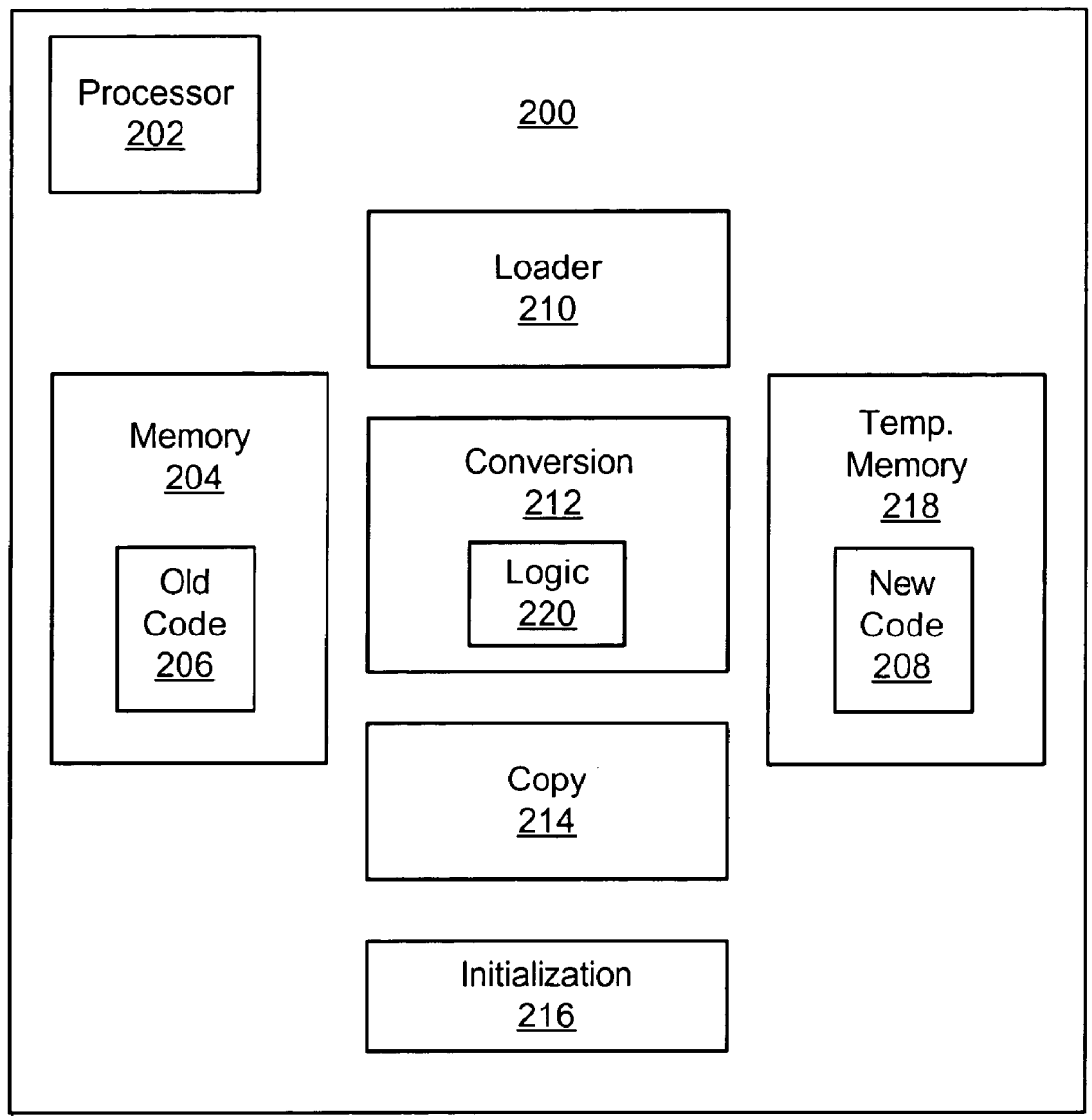
FIG. 2 is a logical block diagram illustrating one embodiment of an apparatus in accordance with the present invention.

FIG. 2 illustrates a logical block diagram of one embodiment of an apparatus 200 in accordance with the present invention. The apparatus 200 includes a processor 202 and a memory 204. As mentioned above, the processor 202 executes a code image 206 that is stored in a memory 204 such as RAM. The code image 206 comprises instructions that allow the processor 202 to execute operations according to its intended purpose. Because the code image 206 is intended to be replaced with a new code image 208, the code image 206 is referred to as an old code image 206 hereinafter.

In addition, the apparatus 200 includes a loader 210, a conversion module 212, a copy module 214, and an initialization module 216. The loader 210 responds to an old code image update command. The loader 210 loads a new code image 208 into a temporary memory location 218. The temporary memory location 218 is separate and apart from the memory 204 that stores the old code image 206. The temporary memory location 218 is configured such that portions of the new code image 206 are executable by the processor 202. In one embodiment, the loader 210 configures the temporary memory location 218 to allow for execution of the new code image 206.

The temporary memory location 218 may comprise separate memory hardware. Alternatively, the temporary memory location 218 may comprise a buffer (not shown) defined within main memory 204 that includes the old code image 206. Preferably, the buffer is not defined within the contiguous memory blocks that may define the old code image 206.

The conversion module 212 selectively reconciles incompatibilities between the old code image 206 and the new code image 208. First, the conversion module 212 determines whether incompatibilities exist. In one embodiment, a logic module 220 identifies incompatibilities. In one embodiment, the logic module 220 accesses version information for the old code image 206 and version information for the new code image 208. The logic module 220 compares the version information to determine whether incompatibilities exist. Alternatively, the logic module 220 may use a variety of other distinguishing characteristics for the old code image 206 and the new code image 208 to determine whether incompatibilities exist. For example, the size or location of the old code image 206 may indicate incompatibilities.

Typically, as code images are developed, the version information is changed to distinguish one code image from another. This version information represents differences between code images. Certain differences may not cause an incompatibility between the software of the code image and other hardware or software of a computer system. Such a situation may arise, for example, when a new code image 208 is a single version number ahead of the old code image 206. Other differences may cause incompatibilities. Incompatibilities may occur, for example, when a new code image 208 is multiple version numbers ahead of the old code image 206.

Incompatibilities are described in more detail below using specific examples. Typically, an incompatibility comprises any difference between the old code image 208 and the new code image 208 that will compromise the performance of the new code image 208 in replacing the old code image 206. The incompatibilities are typically known to those who developed the new code image 208. In certain embodiments, certain incompatibilities may be determined by comparing data structures or other characteristics of the old code image 206 with the new code image 208.

Once the conversion module 212 identifies one or more incompatibilities, the conversion module 212 executes instructions to reconcile the incompatibilities. The instructions executed depend largely on the kind of incompatibility being reconciled. In one instance, reconciling the incompatibility may comprise changing the order of initialization for storage registers, memory, or hardware devices. In another instance, reconciling the incompatibility may comprise converting the format of a data structure in order for the new code image 208 to use the data structure.

Once the conversion module 212 reconciles the incompatibilities or the conversion module 212 identifies no incompatibilities, the copy module 214 copies the new code image 208 into the memory space occupied by the old code image 206. In one embodiment, the new code image 208 is stored in RAM such that the old code image 206 is rapidly replaced by the new code image 208. In this manner, the apparatus 200 is off-line for only a minimal time period. In one embodiment, the copy module 214 may verify that the new code image 208 is successfully copied.

With the new code image 208 copied, the initialization module 216 initiates execution of a run-time segment of the new code image 208. The initialization module 216 directs the processor 202 to begin executing instructions from the new code image 208 within the memory space previously occupied by the old code image 206. Once the initialization module 216 initiates the new code image 206, the apparatus 200 has successfully replaced the old code image 206 with the new code image 208.

Figure 3:
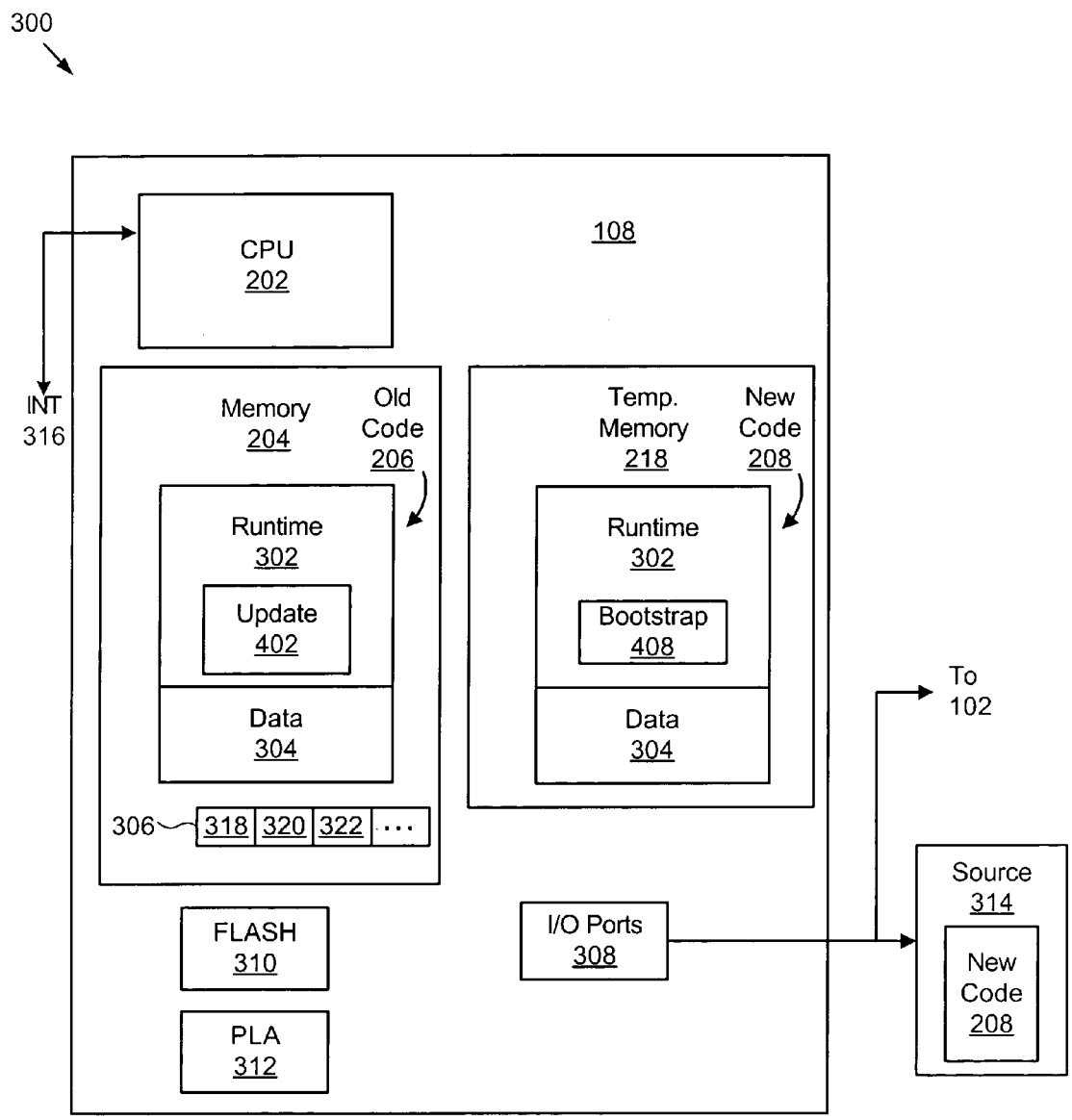
FIG. 3 is a schematic block diagram illustrating a system according to one embodiment of the present invention.

FIG. 3 illustrates one embodiment of a system 300 for overlaying an old code image 206 with a new code image 208 with minimal interruption of operations being performed by the old code image 206. As mentioned above in relation to FIG. 1, an HBA 108 is desirable to ease the workload on a host 104. FIG. 3 illustrates one embodiment of an HBA 108 configured according to the present invention.

The HBA 108 includes a processor 202 such as a CPU 202. Of course, the HBA 108 may include multiple CPUs. The CPU 202 executes instructions in the old code image 206 stored in memory 204. In one embodiment, the old code image 206 is programmed such that the HBA 108 suitably performs high speed I/O operations.

The HBA 108 also includes a temporary memory location 218. During an operation to update the old code image 206, the temporary memory location 218 stores the new code image 208. Preferably, the temporary memory location 218 is configured such that the CPU 202 can execute instructions stored in the temporary memory location 218. In one embodiment, the temporary memory location 218 is a buffer within the memory 204. Preferably, the memory 204 and temporary memory location 218 are high speed main memory such as Random Access Memory (RAM), Non-Volatile Random Access Memory (NVRAM), or the like.

In one embodiment, the old code image 206 and new code image 208 comprise contiguous blocks of memory 204, 218. Alternatively, the code images 206, 208 may be stored in separate blocks. Typically, the code images 206, 208 comprise a run-time segment 302 and a data segment 304. The run-time segment 302 comprises the instructions that are executable by the CPU 202. Instructions in the run-time segment 302 are know as "text." The data segment 304 holds any data and/or data structures that may be used by the executable code in the run-time segment 302. The run-time segment 302 and data segment 304 are illustrated as single blocks; however these segments 302, 304 may be divided into multiple blocks in various configurations.

In addition, the memory 204 may include one or more data structures 306 that are separate from the old code image 206. The data structure 306 discussed in greater detail below, may be designed to facilitate resolving incompatibilities between the old code image 206 and the new code image 208. In one embodiment, the data structure 306 comprises registers of the CPU 202.

The HBA 108 also includes a plurality of other modules and components that interact with the CPU 202 to properly perform I/O operations. For example, I/O ports 308 allow the HBA 108 to communicate data and control information with other devices such as a storage system 102. In addition, various flash RAM components 310, Programmable Logic Arrays (PLA) 312, and other similar devices may be included on the HBA 108.

Figure 4:
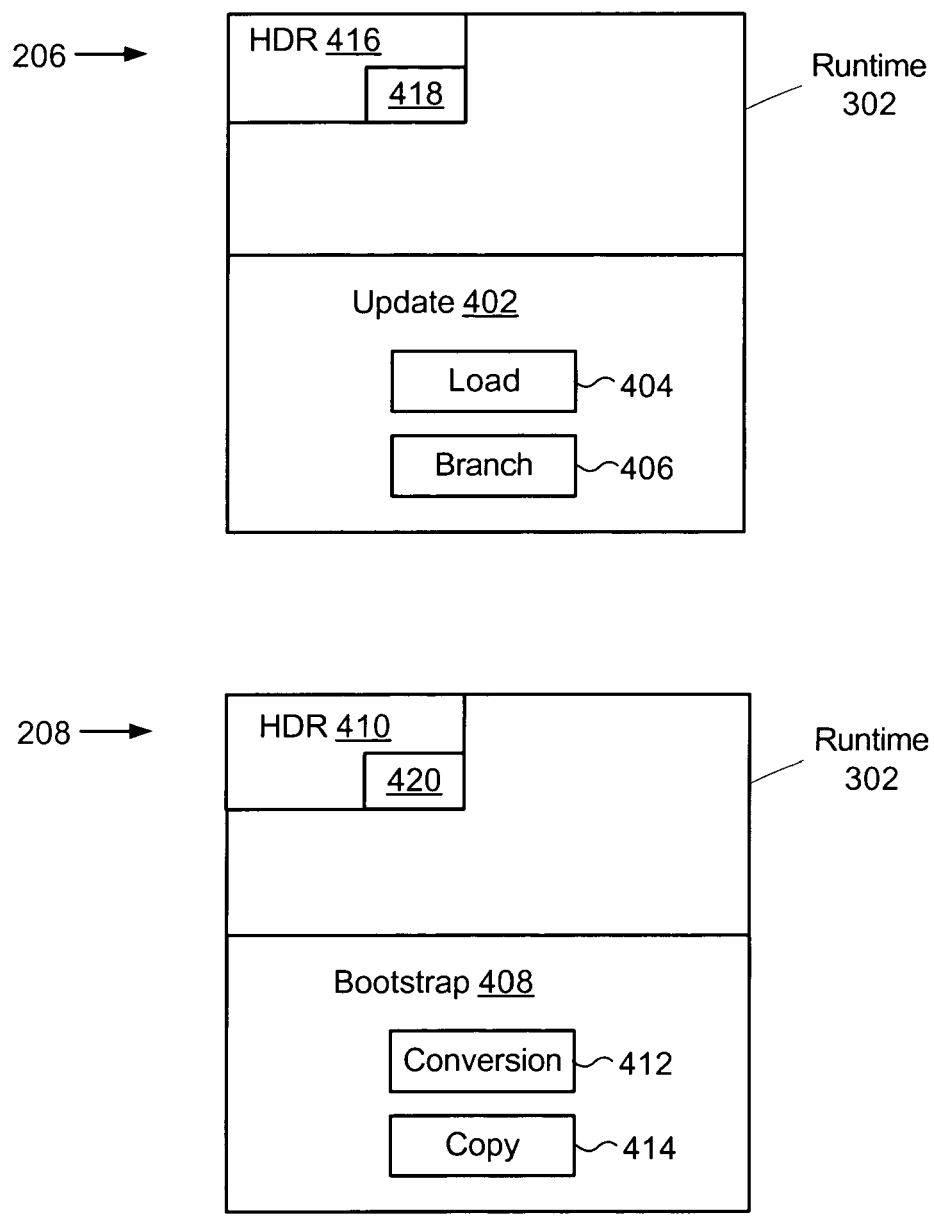
FIG. 4 is a schematic block diagram illustrating representative embodiments of code images configured according to certain embodiments of the present invention.

Operation of one embodiment of the present invention will now be described with reference to FIGS. 3 and 4. FIG. 4 illustrates a run-time segment 302 for both an old code image 206 and a new code image 208 in a representative example.

In one embodiment, suppose the HBA 108 of FIG. 3 is executing an old code image 206. The HBA 108 may be performing a plurality of I/O operations by executing the old code image 206. Suppose a new code image 208 is provided that will provide certain improvements in performance over the old code image 206. The new code image 208 may be provided on a storage device 314 or other source 314 that communicates with the HBA 108 via one or more I/O ports 308.

To replace the old code image 206, an interrupt 316 is sent to the CPU 202. The interrupt 316 may be initiated by a user or an automated process. Preferably, in response to the interrupt 316, the CPU 202 initiates an update thread that begins preparation for replacing the old code image 206. Concurrently, I/O operations continue to be performed by the HBA 108.

Referring now to FIG. 4, in response to the interrupt 316, the CPU 202 branches within the old code image 206 to a particular section of code that may be referred to as an update module 402. In one embodiment, the update module 402 includes a loader 404 and a branch module 406. The loader 404 is configured to load the new code image 208 from the source 314 to the temporary memory location 218 (or buffer). As mentioned above, the temporary memory location 218 is preferably separate from the memory 204 that stores the old code image 206. Of course the loader 404 may complete error checking and other validity checks of the new code image 208.

In certain embodiments, the loader 404 may also configure the memory of the temporary memory location 218 such that instructions are executable directly from the temporary memory location 218. Alternatively, the temporary memory location 218 may be preconfigured to allow for execution of instructions.

In conventional code image updates, bootstrap code of the old code image 206 is executed. In the present invention, the branch module 406 causes the CPU 202 to begin executing instructions located within the bootstrap module 408 of the new code image 208. Consequently, the run-time segment 302 and data segment 304 of both the old code image 206 and the new code image 208 are available. The environment of the old code image 206 is preserved, while the bootstrap module 408 of the new code image 208 is executed.

As mentioned above, the bootstrap module 408 of the new code image 208 may be programmed to reconcile incompatibilities between the old code image 206 and the new code image 208. The incompatibilities were by definition unknown at the time the old code image 206 was written. To facilitate operation of the bootstrap module 408, the update module 402 may store an old code image pointer 318, a new code image pointer 320, capability fields 322 (See FIG. 3), and version numbers for the old code image 206 and/or new code image 208 and the like in a location accessible to the new code image 208. In one embodiment, these pointers and fields 318, 320, 322 are stored in a data structure 306. Alternatively, the information may be stored in registers accessible to the CPU 202.

In one embodiment, the bootstrap module 408 of the new code image 208 is not located at a fixed predefined location within the new code image 208. Instead, the position of the bootstrap module 408 may be variable. For example, the update module 402 may read a new code image header 410 to determine the location of the bootstrap code 408 within the new code image 208.

As one thread loads the new code image 208 and prepares to update the old code image 206, the HBA 108 continues to service I/O processing requests. Once the actual old code image 206 is to be overlaid, servicing of I/O processing requests is temporarily interrupted. Preferably, this interruption is minimized. Conventionally, the bootstrap code within the old code image 206 was executed. It is desirable that execution time for bootstrap code be minimized. The bootstrap code performs two main functions, copying of the new code image over the old code image and initializing data structures and other components prior to initiating execution of the new code image.

As mentioned above, conventional bootstrap code executed in the old code image fails to reconcile incompatibilities between the old code image 206 and the new code image 208. Advantageously, certain embodiments of the present invention execute bootstrap code 408, also known as a bootstrap module 408, stored in the new code image 208.

Referring still to FIG. 4, the bootstrap code 408 may include a conversion module 412 and a copy module 414. In certain embodiments, the conversion module 412 reconciles incompatibilities between the old code image 206 and the new code image 208 using version information associated with the old code image 206 and the new code image 208.

In one embodiment, the conversion module 412 reads version information for the old code image 206 by dereferencing the old code image pointer 318 (See FIG. 3) stored in the data structure 306. By following the old code image pointer 318, the conversion module 412 may locate the old code image header 416. Within the old code image header 416, a version field 418 may store a value representing the version information for the old code image 206. Similarly, the conversion module 412 may use the new code image pointer 320 (See FIG. 3) to locate version information stored in a version field 420 of the new code image header 410. In one embodiment, the new code image header 410 and old code image header 416 are organized according to the Microcode Reconstruct and Boot (MRB) format.

Collection of version information by the conversion module 412 is one example of characteristic information that certain embodiments of the conversion module 412 may collect about the old code image 206 and the new code image 208. For example, in addition to, or in place of, version information, the conversion module 412 may read capability information for the old code image 206. The capability information may be stored in capability fields 322 of the data structure 306. Characteristic information such as version information, capability information, and the like enables the conversion module 412 to identify incompatibilities.

Typically, version information comprises some kind of version designation such as a single number or a series of numbers which represent which version of the code image, new or old, is involved. Initially, the old code image 406 includes a version number. Successive versions of the code image, the new code image 408, have higher version numbers.

The conversion module 412 compares the version information between the old code image 206 and the new code image 208. The versions may be equal. Alternatively, the new code image version may be one version higher or multiple versions higher than the old code image version.

Incompatibilities may be identified by the conversion module 412 using various techniques. In one embodiment, the incompatibilities are implicit, meaning developers who write the new code image 208 know what incompatibilities may exist between different versions of the old code image 206 and the new code image 208. Consequently, a simple comparison of version information may be sufficient to adequately identify the incompatibilities between the old code image 206 and the new code image 208. Implicit incompatibilities may be identified where the old code image 206 and new code image 208 are very specific to a particular computer system or subsystem.

Alternatively, version information in combination with other characteristics may be needed to determine the incompatibilities. In one embodiment, in addition to, or in place of, version information the conversion module 412 may access capability information. Capability information may be stored in one or more capability fields 322 of the data structure 306.

Typically, code images 206, 208 operate in components, subcomponents, and subsystems of larger systems. These larger systems have different configurations, different hardware and software modules, and may have overall different environments. The old code image 206 operably supports and interacts with these other components, subcomponents, and the like.

Accordingly, updating from an old code image 206 to a new code image 208 often requires that the new code image 208 support at least as many of the capabilities of the other components and subcomponents that the old code image 206 did. Consequently, failure of the new code image 208 to support at least the same capabilities as the old code image 206 may also result in an incompatibility between the old code image 206 and the new code image 208.

Of course in certain circumstances, previously supported capabilities of may be removed by applying a new code image 208. If the other components and subcomponents fail to recognize the change in supported capabilities an incompatibility may be created by replacing the old code image 206 with the new code image 208.

Capability information may be recorded in various formats. In one embodiment, a series of capability fields 322 within the data structure 306 comprise the capability information. Each capability field 322 may store a boolean value associated with the capability that is defined by the name of the individual capability field 322. For example, one exemplary capability field 322 may be whether the system in which the old code image 206 operates provides EMULEX FLASH RAM. If so, the capability field 322 stores a true value (which may be represented by a 1). If not, the capability field 322 stores a false value (which may be represented by a 0). Of course other capability fields 322 may be defined. In certain embodiments, the conversion module 412 may identify an incompatibility based at least in part on a difference between capability information of the old code image 206 and capability information of the new code image 208. Identify incompatibilities based on capability information may be useful where version information does not provide enough information. For example, the version numbers of the old code image 206 and the new code image 208 may be equal.

Typically, incompatibilities comprise a difference between the old code image 206 and the new code image 208 which causes the new code image 208 to fail to perform at least to the performance level of the old code image 206. Accordingly, incompatibilities may be manifest in various forms. In one embodiment, at least one of the incompatibilities comprises a difference between data structures used by the old code image 206 and data structures used by the new code image 208. The differences between the data structures may be different values, different formats, and the like. The data structures may be the data structures stored in the data segment 304.

In another aspect, at least one of the incompatibilities may comprise different initialization requirements for the new code image 208 than for the old code image 206. Initialization requirements may comprise resetting of registers, clearing of buffers and/or caches, and the like. In addition, if the new code image 208 adds data structures, these data structures may also need to be initialized.

Referring now back to FIG. 3, the present invention preserves the operating environment of the old code image 206 and the new code image 208 because the new code image 208 is in temporary memory 218 that keeps the new code image 208 separate from the old code image 206. In addition, the data structure 306 and pointers 318, 320 allow the conversion module 412 to access information in both the old code image 206 and the new code image 208. In this manner, incompatibilities may be readily reconciled by the conversion module 412.

Once the incompatibilities are identified, the conversion module 412 reconciles the incompatibilities. Typically, this means that the conversion module 412 adjusts data structures and configuration settings such that the new code image 208 performs at least the same functions as the old code image 206. In addition, the new code image 208 provides improvements over the old code image 206.

In one embodiment, reconciliation of incompatibilities includes the conversion module 412 determining persistent data associated with the old code image 206 and associating the persistent data with the new code image 208. In one embodiment, the conversion module 412 locates the persistent data in the data segment 304 of the old code image 206 and copies the persistent data to the data segment 304 of the new code image 208. The persistent data is then available for use by the run-time segment 302 of the new code image 208. One example of persistent data may be login tables. Preserving persistent data may also serve to minimize the disruption caused once the old code image 206 is actually overlaid with the new code image 208.

In a certain embodiment, once the conversion module 412 reconciles the incompatibilities, the copy module 414 (See FIG. 4) performs a memory to memory copy which overlays the old code image 206 with the new code image 208. In the embodiment of FIG. 3, the copy module 414 copies the new code image 208 from the temporary memory location 218 to the memory 204. Preferably, the copy of the new code image 208 begins in the same address of memory 204 as the old code image 206. In this manner, portions of other microcode and hardware interrupts that may rely on predefined fixed address locations in memory 204 are not adversely impacted. In certain embodiment, the copy module 414 performs integrity and validity checks on the copy of the new code image 208 to verify that the copy is error free. In one embodiment, the copy module 414 may flush the temporary memory 218 once an accurate copy of the new code image 208 is in memory 204.

Preferably, the HBA 108 continues to satisfy I/O processing requests up until the conversion module 412 reconciles incompatibilities and the copy module 414 overlays the old code image 206. In this manner, the processes of updating the old code image 206 provides a minimal interruption to a processor 202 executing regular computer operations. Preferably, the conversion module 412 conducts most of its tasks concurrent with normal execution of the old code image 206 that is handling computer operations such as I/O processing requests.

In certain embodiments, the capability fields 322 identify capabilities for modules such as flashes 310, PLAs 312, and the like which interface with the CPU 202 executing the old code image 206. Accordingly, the capabilities of these modules 310, 312 may cause incompatibilities. Alternatively, the improvements in the new code image 208 may require that these modules 310, 312 be updated. In addition, or alternatively, the difference between version information of the old code image 206 and the new code image 208 may indicate that these modules 310, 312 should be updated. Consequently, the conversion module 412 may update the modules 310, 312 as part of reconciling incompatibilities. For example, the conversion module 412 may execute instructions for burning a new FLASH image to update a FLASH RAM module 310 or a PLA module 312. Of course the conversion module 412 may update other modules that will interface with the new code image 208.

Figure 5:
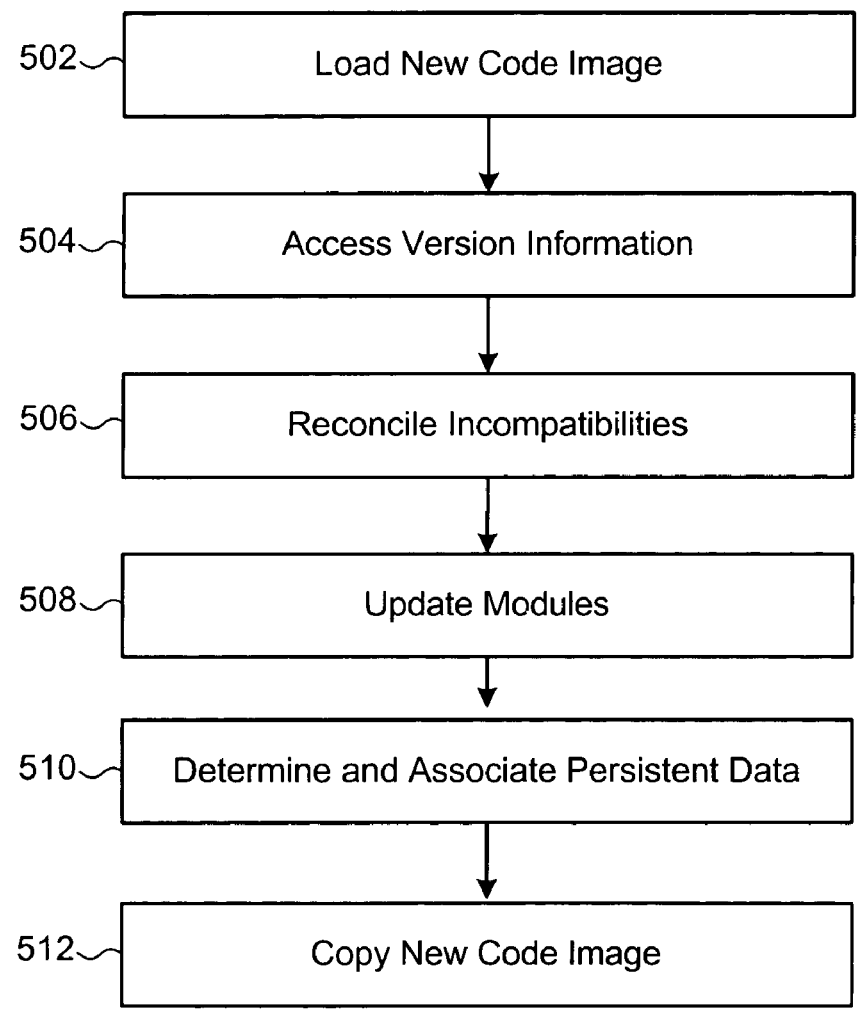
FIG. 5 is a schematic flow chart diagram illustrating one embodiment of a method for updating a code image.

FIG. 5 is a flow chart diagram of a method 500 for updating a code image according to one embodiment. The method 500 begins by loading 502 a new code image 208 into a temporary memory location 218. The temporary memory location 218 is separate from the memory space storing the old code image 206. Next, code within the bootstrap code 408 of the new code image 208 accesses 504 version information for the old code image 206 and the new code image 208. Preferably, the bootstrap code 408 reads version fields 418, 420 stored respectively in the old code image header 416 and the new code image header 410.

Next, bootstrap code 408 of the new code image 208 determines and reconciles 506 incompatibilities between the old code image 206 and the new code image 208. Incompatibilities may comprise different formats for data structures, parameter lists, protocol procedure, initialization, and the like. To reconcile the incompatibilities, the bootstrap code 408 may burn FLASH updates, copy new segments of code to modules that will interface with the new code image 208, maintain persistent data, and the like.

In one embodiment, based on the incompatibilities identified, the bootstrap code 408 updates 508 other hardware and software components that will interface with the new code image 208. In addition, the bootstrap code 408 may determine persistent data and associate 510 the persistent data with the new code image 208.

Preferably, once incompatibilities are reconciled, the bootstrap code 408 copies 512 the new code image 208 over the top of the old code image 206 in memory 204. In addition, the bootstrap code 408 may also confirm that the new code image 208 was copied accurately.

Figure 6:
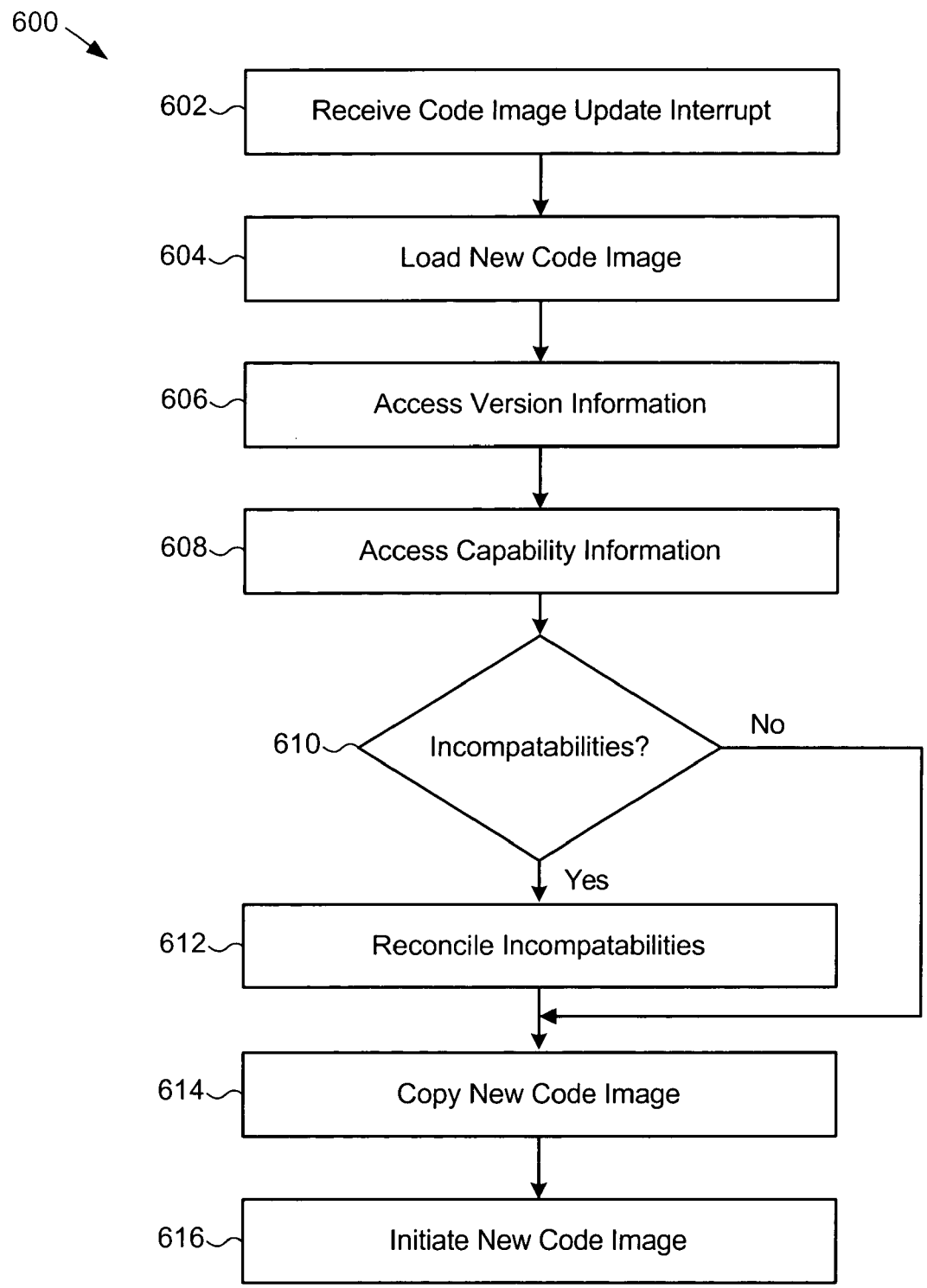
FIG. 6 is a schematic flow chart diagram illustrating one embodiment of a more detailed method for updating a code image.

FIG. 6 is a flow chart diagram of a detailed method 600 for updating a code image according to one embodiment. The method 600 begins when a processor 202 receives 602 a code image update interrupt 316. Preferably, the processor 202 initiates a thread for conducting the update such that other threads may service I/O requests concurrent with conducting the code image update.

Next, code in the old code image 206 loads 604 the new code image 208 into a buffer or other memory location 218 separate from the memory space occupied by the old code image 206. Bootstrap code 408 of the new code image 208 is initiated. The bootstrap code 408 of the new code image 208 accesses 606 version information for the old code image 206 and the new code image 208. Alternatively, or in addition, the bootstrap code 408 accesses 608 capability information. Preferably, the capability information is stored in capability fields 322.

Based on the version information and/or the capability information, the bootstrap code 408 determines 610 whether incompatibilities exist between the new code image 208 and the old code image 206 and/or between the new code image 208 and the environment of the old code image 206. If there are incompatibilities, the bootstrap code 408 reconciles 612 the incompatibilities. If not, the bootstrap code 408 copies 614 the new code image 208 over the old code image 206. Preferably, the new code image 208 occupies substantially the same memory space as the old code image 206.

Finally, with the new code image 208 in place, the bootstrap code 408 initiates 616 execution of the run-time segment 302 of the new code image 208. In certain embodiments, the bootstrap code 408 may free the memory previously occupied by the new code image 208.

In summary, the present invention provides an apparatus, system, and method for updating a code image. The present invention identifies incompatibilities between an old code image and a new code image and between the new code image and the environment of the old code image. The present invention reconciles incompatibilities between the old code image and a new code image. To facilitate reconciliation of incompatibilities by the bootstrap code of the new code image, the present invention preserves the environment associated with the old code image. In addition, the present invention completes reconciliation of incompatibilities prior to copying the new code image over the old code image.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for updating an embedded code image in a host bus adapter performing high speed data transfer between a host system and a storage system, comprising a processor, a main memory, and a temporary memory, the main memory and the temporary memory storing Microcode Reconstruct and Boot (MRB) format code images, and the apparatus further comprising:

the processor executing executable code stored on the main memory occupied by and used by an old code image comprising a first MRB format header, the executable code comprising:
a loader stored in the main memory and loading a new code image comprising a second MRB format header into the temporary memory;
a branch module stored in the main memory causing the processor to execute a bootstrap module within the new code image;
the bootstrap module accessing an old code image version number pointed to by the first MRB format header and a new code image version number pointed to by the second MRB format header;
the bootstrap module identifying:
incompatibilities between the old code image and the new code image from the old code image version number and the new code image version number;
a difference in initialization requirements for storage registers, memory, and hardware devices; and
a difference in size and location between the old code image and the new code image;
the bootstrap module further:
accessing capability information for the old code image and capability information for the new code image;
identifying a difference between the capability information; and
reconciling the incompatibilities by
changing an initialization order;
converting a format of a data structure of the old code image to a format compatible with a data structure of the new code image; and
associating persistent data of the old code image with the new code image, such that the persistent data is available in response to execution of a run-time segment of the new code image; and
a copy module copying the new code image into the main memory space occupied by the old code image.

2. The apparatus of claim 1, wherein the old code image is updated concurrently with normal execution of transactions by the apparatus.

3. The apparatus of claim 1, the executable code further comprising an initialization module initiating execution of the run-time segment.

4. The apparatus of claim 1, wherein the loader configures the temporary memory so that the executable code is executed directly from the temporary memory, the executable code further comprising an update module stored in the main memory maintaining an old code image pointer, a new code image pointer, capability fields storing the capability information, the old code image version number, the new code image version number, the old code image pointer, the new code image pointer, the capability fields, the old code image version number, and the new code image version number used by the bootstrap module, wherein the bootstrap module follows the old code image pointer to locate an old code image header and a version field within the old code image header and follows the new code image pointer to locate a new code image header and a version field within the new code image header, the old code image header and the new code image header are organized according to the MRB format, the bootstrap module reading the capability information from the old code image and the new code image and storing the capability information of the old code image and the new code image in the capability fields, the capability information comprising an indication that an EMULEX FLASH Random Access Memory (RAM) is provided, the persistent data comprising login tables, and wherein reconciling incompatibilities between the old code image and the new code image further comprises adjusting configuration settings and parameter lists.

5. The apparatus of claim 4, wherein identifying incompatibilities further comprises identifying a difference between the format of the data structure used by the old code image and the format compatible with the data structure used by the new code image.

6. An apparatus for updating an embedded code image in a host bus adapter performing high speed data transfer between a host system and a storage system, comprising a processor, a main memory, and a temporary memory, the main memory and the temporary memory storing Microcode Reconstruct and Boot (MRB) format code images, the apparatus further comprising:

the processor executing executable code stored on the main memory occupied by and used by an old code image comprising a first MRB format header, the executable code comprising
a loader loading a new code image comprising a second MRB format header into the temporary memory;
a branch module stored in the main memory causing the processor to execute a bootstrap module within the new code image;
the bootstrap module accessing an old code image version number pointed to by the first MRB format header and a new code image version number pointed to by the second MRB format header;
the bootstrap module identifying:
incompatibilities between the old code image and the new code image from the old code image version number and the new code image version number;
a difference in initialization requirements for storage registers, memory, and hardware devices; and
a difference in size and location between the old code image and the new code image;
the bootstrap module further:
accessing capability information for the old code image and capability information for the new code image;
identifying a difference between the capability information; and
reconciling the incompatibilities by changing an initialization order;
converting a data structure of the old code image to a format compatible with a data structure of the new code image prior to copying the new code image into the memory space occupied by the old code image;
associating persistent data of the old code image with the new code image, such that the persistent data is available in response to execution of a run-time segment of the new code images; and
copying the new code image into the main memory space occupied by the old code image.

7. The apparatus of claim 6, the executable code further comprising a copy module copying the new code image over the old code image in the main memory after the incompatibilities have been reconciled.

8. The apparatus of claim 6, wherein identifying incompatibilities further comprises identifying a difference between the format of the data structure used by the old code image and the format compatible with the data structure used by the new code image.

9. The apparatus of claim 6, wherein the loader configures the temporary memory so that the executable code is executed directly from the temporary memory, the executable code further comprising an update module stored in the main memory maintaining an old code image pointer, a new code image pointer, capability fields storing the capability information, the old code image version number, the new code image version number, the old code image pointer, the new code image pointer, the capability fields, the old code image version number, and the new code image version number used by the bootstrap module, wherein the bootstrap module follows the old code image pointer to locate an old code image header and a version field within the old code image header and follows the new code image pointer to locate a new code image header and a version field within the new code image header, the old code image header and the new code image header are organized according to the MRB format, the bootstrap module reading the capability information from the old code image and the new code image and storing the capability information of the old code image and the new code image in the capability fields, the capability information comprising an indication that an EMULEX FLASH Random Access Memory (RAM) is provided, the persistent data comprising login tables, and wherein reconciling incompatibilities between the old code image and the new code image further comprises adjusting configuration settings and parameter lists and associating persistent data of the old code image with the new code image.

10. A system for updating an embedded code image in a host bus adapter performing high speed data transfer between a host system and a storage system, the system comprising a processor, a main memory, and a temporary memory, the main memory and the temporary memory storing Microcode Reconstruct and Boot (MRB) format code images, the system further comprising:
the main memory storing an old code image comprising a first MRB format header;
the temporary memory separate from the main memory and storing a new code image comprising a second MRB format header;
a processor executing executable code of the old code image and the new code image, the executable code comprising;
a loader stored in the main memory and loading the new code image into the temporary memory;
a branch module stored in the main memory causing the processor to execute a bootstrap module within the new code image; and
the bootstrap module accessing an old code image version number pointed to by the first MRB format header and a new code image version number pointed to by the second MRB format header, the bootstrap module identifying:
incompatibilities between the old code image and the new code image from the old code image version number and the new code image version number;
a difference in initialization requirements for storage registers, memory, and hardware devices; and
a difference in size and location between the old code image and the new code image;
the bootstrap module further
accessing capability information for the old code image and capability information for the new code image;
identifying a difference between the capability information; and
reconciling the incompatibilities by
changing an initialization order;
converting a format of a data structure of the old code image to a format compatible with a data structure of the new code image;
associating persistent data of the old code image with the new code image, such that the persistent data is available in response to execution of a run-time segment of the new code image; and
copying the new code image into the main memory space occupied by the old code image.

11. The system of claim 10, the executable code further comprising a copy module stored within the new code image overlaying the new code image in main memory with the old code image in response to reconciling the incompatibilities.

12. The system of claim 11, the loader loading the new code image into the temporary memory in response to an interrupt.

13. The system of claim 12, wherein the update module stores the old code image pointer and the new code image pointer in the data structure.

14. The system of claim 10, wherein the loader configures the temporary memory so that the executable code is executed directly from the temporary memory, the executable code further comprising an update module stored in the main memory maintaining an old code image pointer, a new code image pointer, capability fields storing the capability information, the old code image version number, the new code image version number, the old code image pointer, the new code image pointer, the capability fields, the old code image version number, and the new code image version number used by the bootstrap module, wherein the bootstrap module follows the old code image pointer to locate an old code image header and a version field within the old code image header and follows the new code image pointer to locate a new code image header and a version field within the new code image header, the old code image header and the new code image header are organized according to the MRB format, the bootstrap module reading the capability information from the old code image and the new code image and storing the capability information of the old code image and the new code image in the capability fields, the capability information comprising an indication that an EMULEX FLASH Random Access Memory (RAM) is provided, the persistent data comprising login tables, and wherein reconciling incompatibilities between the old code image and the new code image further comprises adjusting configuration settings and parameter lists.

15. The system of claim 14, wherein the bootstrap module further reconciles the incompatibilities by updating modules that interface with the new code image.

16. A method for updating an embedded code image in a host bus adapter performing high speed data transfer between a host system and a storage system, comprising a processor, a main memory, and a temporary memory, the main memory and the temporary memory storing Microcode Reconstruct and Boot (MRB) format code images, the method further comprising:
loading, by use of the processor, a new code image comprising a second MRB format header into the temporary memory location separate from the main memory space occupied by and used by an old code image comprising a first MRB format header;
executing a bootstrap module within the new code image;
accessing an old code image version number pointed to by the first MRB format header and a new code image version number pointed to by the second MRB format header;
identifying, using the bootstrap module:

incompatibilities between the old code image and the new code image from the old code image version number and the new code image version number:
   a difference in initialization requirements for storage registers, memory, and hardware devices; and
   a difference in size and location between the old code image and the new code image;
accessing, using the bootstrap module, capability information for the old code image and capability information for the new code image;
identifying, using the bootstrap module: a difference between the capability information;
reconciling, using the bootstrap module executed by the processor, the incompatibilities by
   changing an initialization order;
   converting a data structure of the old code image to a format compatible with a data structure of the new code image using bootstrap code of the new code image; and
   associating persistent data of the old code image with the new code image, such that the persistent data is available in response to execution of a run-time segment of the new code image; and
copying the new code image into the main memory space occupied by the old code image.

17. The method of claim 16, wherein the new code image is copied to the main memory concurrently with execution of regular computer operations.

18. The method of claim 16, further comprising initiating execution of the run-time segment of the new code image.

19. The method of claim 16, wherein the new code image is copied into the main memory after the incompatibilities are reconciled.

20. The method of claim 16, the method further comprising configuring the temporary memory so that the executable code is executed directly from the temporary memory, maintaining an old code image pointer, a new code image pointer, capability fields storing the capability information, the old code image version number, the new code image version number, the old code image pointer, the new code image pointer, the capability fields, the old code image version number, and the new code image version number used by the bootstrap module, wherein the bootstrap module follows the old code image pointer to locate an old code image header and a version field within the old code image header and follows the new code image pointer to locate a new code image header and a version field within the new code image header, the old code image header and the new code image header are organized according to the MRB format, the bootstrap module reading the capability information from the old code image and the new code image and storing the capability information of the old code image and the new code image in the capability fields, the capability information comprising an indication that an EMULEX FLASH Random Access Memory (RAM) is provided, the persistent data comprising login tables, wherein reconciling incompatibilities between the old code image and the new code image further comprises adjusting configuration settings and parameter lists.

21. The method of claim 20, wherein identifying incompatibilities further comprises identifying a difference between the format of the data structure used by the old code image and the format compatible with the data structure used by the new code image.

22. An apparatus for updating an embedded code image in a host bus adapter performing high speed data transfer between a host system and a storage system, the apparatus comprising a processor, a main memory, and a temporary memory, the main memory and the temporary memory storing Microcode Reconstruct and Boot (MRB) format code images and the apparatus further comprising:
   the processor executing executable code stored on the main memory occupied by and used by an old code image comprising a first MRB format header, the executable code comprising:
   means for loading a new code image comprising a second MRB format header into the temporary memory;
   means for causing the processor to execute a bootstrap module within the new code image;
   means within the bootstrap module for accessing an old code image version number pointed to by the first MRB format header and a new code image version number pointed to by the second MRB format header;
   means within the bootstrap module for identifying:
      incompatibilities between the old code image and the new code image from the old code image version number and the new code image version number;
      a difference in initialization requirements for storage registers, memory, and hardware devices; and
      a difference in size and location between the old code image and the new code image;
   means with the bootstrap module for accessing capability information for the old code image and capability information for the new code image and identifying a difference between the capability information;
   means within the bootstrap module for reconciling the incompatibilities by
      changing an initialization order;
      converting a format of a data structure of the old code image to a format compatible with a data structure of the new code image using bootstrap code of the new code image; and
      associating persistent data of the old code image with the new code image, such that the persistent data is available in response to execution of a run-time segment of the new code image; and
   means for copying the new code image into the memory space occupied by the old code image.

23. The apparatus of claim 22, wherein loading means configures the temporary memory so that the executable code is executed directly from the temporary memory, the executable code further comprising maintaining means stored in the main memory maintaining an old code image pointer, a new code image pointer, capability fields storing the capability information, the old code image version number, the new code image version number, the old code image pointer, the new code image pointer, the capability fields, the old code image version number, and the new code image version number used by the bootstrap module, wherein the bootstrap module follows the old code image pointer to locate an old code image header and a version field within the old code image header and follows the new code image pointer to locate a new code image header and a version field within the new code image header, the old code image header and the new code image header are organized according to the MRB format, the bootstrap module reading the capability information from the old code image and the new code image and storing the capability information of the old code image and the new code image in the capability fields, the capability information comprising an indication that an EMULEX FLASH Random Access Memory (RAM) is provided, the persistent data comprising login tables, and wherein reconciling incompatibilities between the old code image and the new code image further comprises adjusting configuration settings and parameter lists.

24. An article of manufacture comprising a program storage medium readable by a processor and embodying one or more instructions executable by a processor to perform a method for updating an embedded code image in a host bus adapter performing high speed data transfer between a host system and a storage system by use of the processor, a main memory, and a temporary memory, the main memory and the temporary memory Microcode Reconstruct and Boot (MRB) format code images, the method comprising:

loading, by use of the processor, a new code image comprising a second MRB format header into the temporary memory location separate from a memory space occupied by and used by an old code image comprising a first MRB format header;

causing the processor to execute a bootstrap module within the new code image;

accessing, using the bootstrap module, an old code image version number pointed to by the first MRB format header and a new code image version number pointed to by the second MRB format header;

identifying, using the bootstrap module:
  incompatibilities between the old code image and the new code image from the old code image version number and the new code image version number;
  a difference in initialization requirements for storage registers, memory, and hardware devices; and
  a difference in size and location between the old code image and the new code image;

accessing, by using the bootstrap module, capability information for the old code image and capability information for the new code image and identifying a difference between the capability information;

reconciling, using the bootstrap module executed by the processor, the incompatibilities by
  changing an initialization order;
  converting a format of a data structure of the old code image to a format compatible with a data structure of the new code image using bootstrap code of the new code image; and
  associating persistent data of the old code image with the new code image, such that the persistent data is available in response to execution of a run-time segment of the new code image; and copying the new code image into the main memory space occupied by the old code image.

25. The article of manufacture of claim 24, the method further comprising configuring the temporary memory so that the executable code is executed directly from the temporary memory, maintaining an old code image pointer, a new code image pointer, capability fields storing the capability information, the old code image version number, the new code image version number, the old code image pointer, the new code image pointer, the capability fields, the old code image version number, and the new code image version number used by the bootstrap module, wherein the bootstrap module follows the old code image pointer to locate an old code image header and a version field within the old code image header and follows the new code image pointer to locate a new code image header and a version field within the new code image header, the old code image header and the new code image header are organized according to the MRB format, the bootstrap module reading the capability information from the old code image and the new code image and storing the capability information of the old code image and the new code image in the capability fields, the capability information comprising an indication that an EMULEX FLASH Random Access Memory (RAM) is provided, the persistent data comprising login tables, and wherein reconciling incompatibilities between the old code image and the new code image further comprises adjusting configuration settings and parameter lists and associating persistent data of the old code image with the new code image.

* * * * *